US012705544B2

(12) United States Patent
Gerasimov et al.

(10) Patent No.: US 12,705,544 B2
(45) Date of Patent: Aug. 11, 2026

(54) SYSTEMS AND METHODS FOR PRESENTATION ATTACK DETECTION USING PATCH MODELS

(71) Applicant: UNICOTECH PORTUGAL, UNIPESSOAL LDA, Lisbon (PT)

(72) Inventors: Artem Gerasimov, Dubai (AE); Yury Litvinov, Almaty (KZ); Ivan Kryachko, Almaty (KZ); Bakai Zhamgyrchiev, Almaty (KZ); Svetlana Efimova, Dubai (AE)

(73) Assignee: UNICOTECH PORTUGAL, UNIPESSOAL LDA, Lisbon (PT)

( * ) Notice: Subject to any disclaimer, the term of this patent is extended or adjusted under 35 U.S.C. 154(b) by 264 days.

(21) Appl. No.: 18/533,827

(22) Filed: Dec. 8, 2023

(65) Prior Publication Data

US 2025/0190850 A1 Jun. 12, 2025

(51) Int. Cl.
*G06N 20/00* (2019.01)
*G06V 40/40* (2022.01)

(52) U.S. Cl.
CPC ............ *G06N 20/00* (2019.01); *G06V 40/40* (2022.01); *G06V 2201/10* (2022.01)

(58) Field of Classification Search
CPC ..... G06N 20/00; G06V 40/40; G06V 2201/10
See application file for complete search history.

(56) References Cited

U.S. PATENT DOCUMENTS

| | | | | |
|---|---|---|---|---|
| 10,885,099 | B1 | 1/2021 | Price et al. | |
| 2020/0104706 | A1 | 4/2020 | Sandler et al. | |
| 2021/0209388 | A1* | 7/2021 | Ciftci | G06N 3/045 |
| 2021/0256125 | A1* | 8/2021 | Miller | G06F 21/577 |
| 2022/0058172 | A1* | 2/2022 | John | G06N 5/01 |

* cited by examiner

*Primary Examiner* — Andrew M Moyer
*Assistant Examiner* — Conor A O'Malley
(74) *Attorney, Agent, or Firm* — ESPE Legal Consultancy FZ-LLC

(57) ABSTRACT

Systems and methods for patching a general machine learning model in a system for detecting presentation attacks. The machine learning model includes a false positive or a false negative misclassification. A patch model is trained using samples misclassified by the general machine learning model to correct the misclassification by the general machine learning model once deployed in the system pipeline.

18 Claims, 8 Drawing Sheets

Build corrector ML model 702

Execute baseline ML model on image samples 706

Select calibration dataset for image samples processed correctly 708

Determine misclassified image sample from baseline ML model 710

Apply augmentation to misclassified image sample, add to anomaly data set if still misclassified 712

Repeat applying augmentation for another misclassified image until anomaly dataset value reached 714

Calculate features of baseline ML model associated with calibration dataset and anomaly dataset 716

Apply linear discriminant to build linear classifier 718

Determine correction shift 720

Wrap baseline ML model with corrector ML model to generate wrapped baseline ML model 704

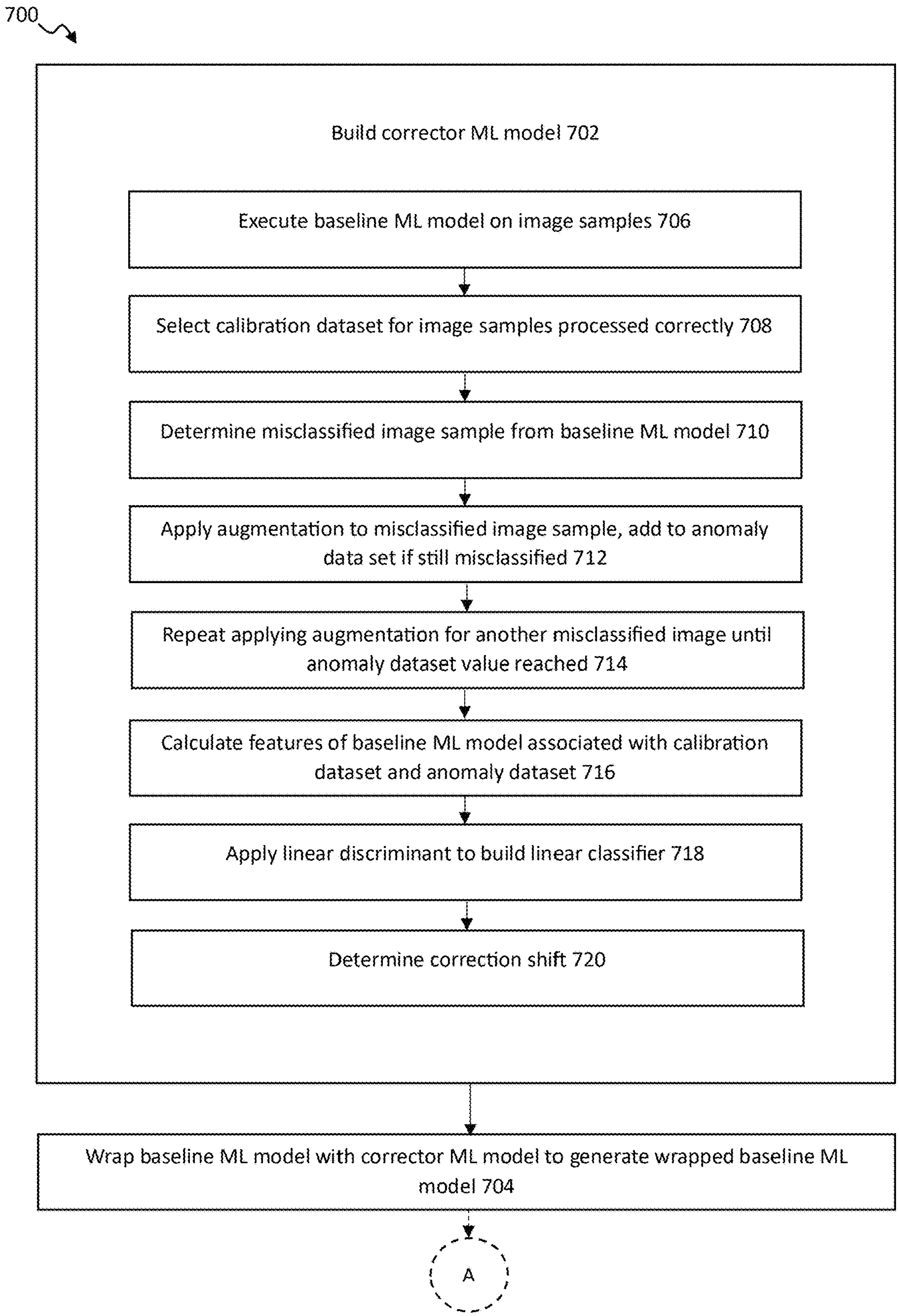

FIG. 7

SYSTEMS AND METHODS FOR PRESENTATION ATTACK DETECTION USING PATCH MODELS

TECHNICAL FIELD

The current invention relates generally to presentation attack detection. More particularly, the invention relates to correcting presentation attack detection models.

BACKGROUND

Biometrics can deliver a unique combination of high security and ease of use in applications that require identity authentication, such as access control, payments, or travel. A presentation attack is a "spoof" or "deep fake" or other subverting presentation to a biometric data capture subsystem with the goal of interfering with the operation of the biometric system. The types of attacks and the methods of attackers on these systems are constantly evolving.

An initial problem arises in the classification of whether a video or an image recorded for the purpose of biometric identification contains a real person or some kind of face-spoofing attack (presentation attack, deep fake etc.), and particularly classification of a type that was unknown at the time the system was designed.

Traditionally, a threat detection model is trained based on datasets of samples of original images and samples of fake images (attacks). However, in order to detect a threat with the required accuracy, it is necessary to compare the test sample with a set of good samples or their derivatives and a set of attack samples or their derivatives. Thus, it is often difficult or impossible to detect new types of attacks.

Further, the model may contain errors in detecting known threat patterns that are reproduced under certain unpredictable conditions, for example, mirrors entering the frame, bright illumination and high contrast, shadows entering the frame, unpredictable results of a known mask in light or environment conditions, or a combination of several such factors. These errors are a vulnerability in the system and can be exploited by an attacker until the detection model is corrected.

The process of modifying or correcting the model for classifying images in order to determine the reliability of the user's image requires a lot of effort and time. For example, even if the definition of new class objects and their features takes a short time, retraining a model built on big data can take a long time—days or even weeks. During this time, the protected service will be at risk. Thus, a problem exists in reducing the time for correcting errors in image classification and searching for cases of exploitation of these types of errors.

Therefore, there is a need for systems and methods that can patch presentation attack models.

SUMMARY

Embodiments described or otherwise contemplated herein substantially meet the aforementioned needs of the industry. Systems and methods provide "patch" machine learning (ML) models to improve presentation attack detection without retraining detection models. New types of attacks can be detected and mistakes can be corrected without (or before) retraining the detection model in production biometric systems.

In an embodiment, a method for presentation attack detection comprises building a corrector machine learning (ML) model including by: executing a baseline ML model on a plurality of image samples to obtain a plurality of features, selecting a calibration dataset of a plurality of image samples that are processed correctly by the baseline ML model, determining at least one misclassified image sample, the at least one misclassified image sample having a verdict from the baseline ML model to be corrected, applying at least one augmentation to the at least one misclassified image sample to obtain an augmented image and if the augmented image is still misclassified by the baseline model, adding the augmented image to an anomaly dataset, repeating the applying the at least one augmentation to another at least one misclassified image sample until a size of the anomaly dataset reaches a predefined value, calculating a plurality of features of the baseline ML model associated with the calibration dataset and the anomaly dataset, applying a linear discriminant analysis to build a linear classifier, and determining a correction shift as a value that ensures a particular misclassification rate on the anomaly dataset with a particular minimum misclassification rate on the calibration dataset; and wrapping the baseline ML model with the corrector ML model to generate a wrapped baseline ML model.

In one aspect, a method for presentation attack detection further comprises obtaining an image sample; executing the baseline ML model from the wrapped baseline ML model to produce a baseline score; classifying the image sample as regular or anomalous by applying the linear classifier to the features of the baseline ML model; when the image sample is classified as regular, calculating a final score as the baseline score; when the image sample is classified as anomalous, calculating the final score by correction shifting according to the correction shift by addition if the baseline ML of the wrapped baseline ML model classified the image sample as an original image or subtraction according to the correction shift if the baseline ML model of the wrapped baseline ML model classified the image sample as a non-original image; and determining if the image sample is an original image or an attack based on the final score.

In an embodiment, a system for presentation attack detection comprises a baseline machine learning (ML) model; a corrector ML model, built including by: executing the baseline ML model on a plurality of image samples to obtain a plurality of features, selecting a calibration dataset of a plurality of image samples that are processed correctly by the baseline ML model, determining at least one misclassified image sample, the at least one misclassified image sample having a verdict from the baseline ML model to be corrected, applying at least one augmentation to the at least one misclassified image sample to obtain an augmented image and if the augmented image is still misclassified by the baseline model, adding the augmented image to an anomaly dataset, repeating the applying the at least one augmentation to another at least one misclassified image sample until a size of the anomaly dataset reaches a predefined value, calculating a plurality of features of the baseline ML model associated with the calibration dataset and the anomaly dataset, applying a linear discriminant analysis to build a linear classifier, and determining a correction shift as a value that ensures a particular misclassification rate on the anomaly dataset with a particular minimum misclassification rate on the calibration dataset; and a wrapped baseline ML model generated by wrapping the baseline ML model with the corrector ML model.

In one aspect, a system for presentation attack detection further comprises an attack detection module configured to: obtain an image sample; execute the patched baseline ML model from the wrapped baseline ML model to produce a baseline score, classify the image sample as regular or anomalous by applying the linear classifier to the features of the baseline ML model, when the image sample is classified as regular, calculating a final score as the baseline score, when the image sample is classified as anomalous, calculating the final score by correction shifting according to the correction shift by addition if the baseline ML of the wrapped baseline ML model classified the image sample as an original image or subtraction according to the correction shift if the baseline ML model of the wrapped baseline ML model classified the image sample as a non-original image, and determine if the image sample is an original image or an attack based on the final score.

In an embodiment, a method for presentation attack detection comprises wrapping a baseline machine learning (ML) model with a corrector ML model to generate a wrapped baseline ML model; obtaining an image sample; executing the baseline ML model from the wrapped baseline ML model to produce a baseline score; classifying the image sample as regular or anomalous by applying a linear classifier to the features of the baseline ML model; when the image sample is classified as regular, calculating a final score as the baseline score; when the image sample is classified as anomalous, calculating the final score by correction shifting according to a correction shift by addition if the baseline ML of the wrapped baseline ML model classified the image sample as an original image or subtraction according to the correction shift if the baseline ML model of the wrapped baseline ML model classified the image sample as a non-original image; and determining if the image sample is an original image or an attack based on the final score.

In a feature and advantage of embodiments, systems and methods provide improved robustness in classification of whether a video or an image recorded for the purpose of biometric identification contains a real person or some kind of face spoofing attack (presentation attack, deep fake etc.).

In a feature and advantage of embodiments, systems and methods provide improved detection where previously unknown types of presentation attacks or complicated types of presentation attacks are used.

In a feature and advantage of embodiments, systems and methods provide real-time or nearly real-time correction of threat detection models to correct mistakes in production biometric systems.

In a feature and advantage of embodiments, a "patch" machine learning model ("patch model) can be generated and trained in the same feature space (including, for example, training on erroneous data) to integrate the patch model into the production pipeline to correct the ability of the production machine learning model to classify presentation attacks.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which:

FIGS. 7-8 are a flowchart of a method for presentation attack detection, according to an embodiment.

Figure 1:
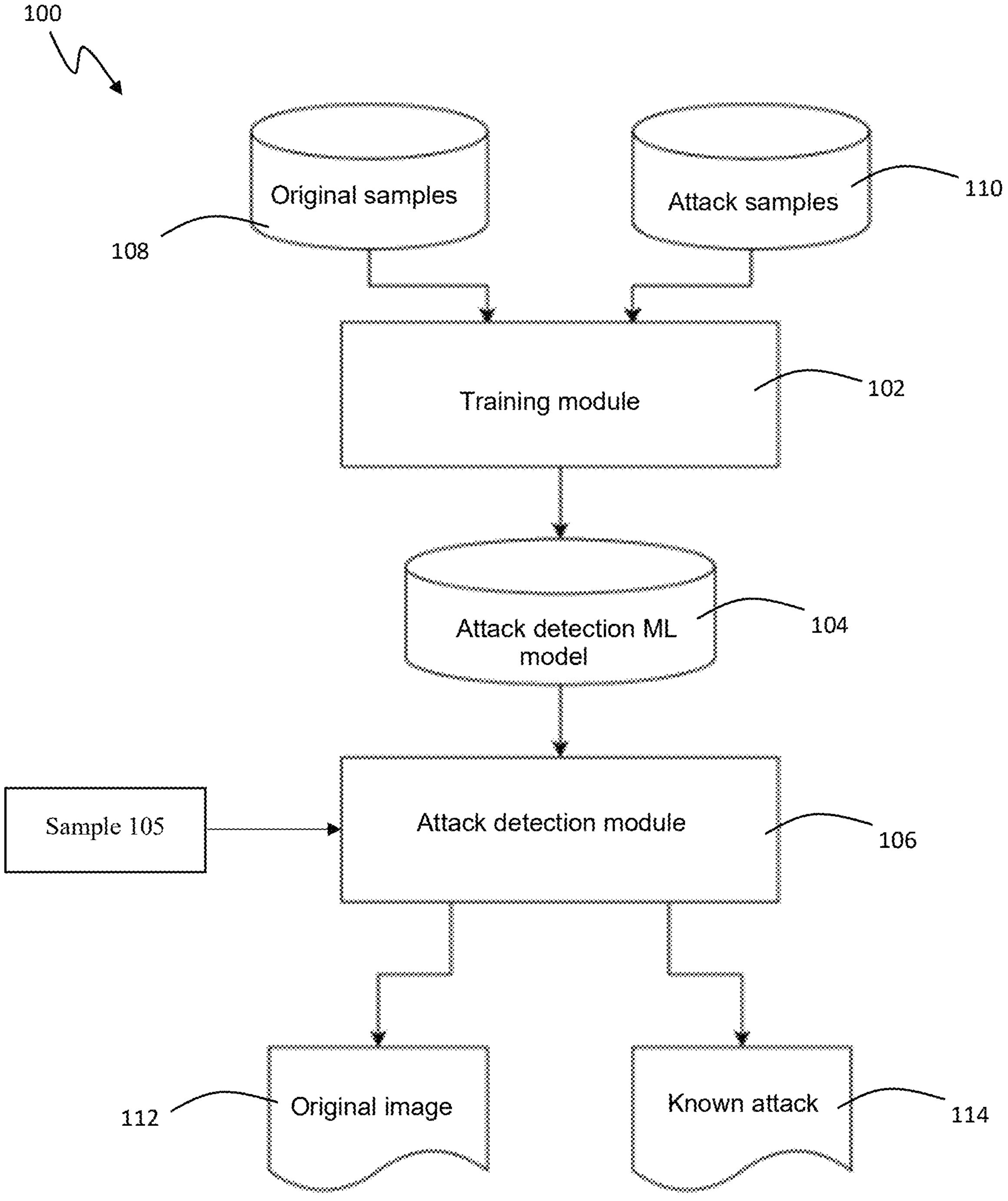
FIG. 1 is a block diagram of a system for presentation attack detection, according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

Systems and methods described herein include a "patch model" that can be trained to quickly and in real-time or nearly real-time correct production models until a subsequent generation of full models can be deployed. In an embodiment, data that has been determined to be erroneous can be used to train a small "patch" model to distinguish erroneous data. In an embodiment, the base model classifies a test sample and processes the result if the patch model classifies the test sample as a "regular" dataset. In an embodiment a decision on handling the test sample is implemented if the patch model classifies the sample as "erroneous."

When an error is detected during testing or operation of the system, objects (images) that were incorrectly classified are determined. Errors can include a Type I (false positive) error or a Type II (false negative) error. If the classification of objects uses several machine learning models arranged in a certain sequence, it can be difficult to determine which model introduced an error into the calculations. Accordingly, a cascade of models or ensembles of models that have an error in final verdicts are referred to as a general or production model. For this general model, a patch is generated that corrects the classification result.

As described herein, systems can include various engines or modules, each of which is constructed, programmed, configured, or otherwise adapted, to autonomously carry out a function or set of functions. The term engine as used herein is defined as a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

Referring to FIG. 1, a block diagram of a system 100 for presentation attack detection is depicted, according to an embodiment. System 100 generally comprises a training module 102, an attack detection machine learning model 104, and an attack detection module 106. FIG. 1 illustrates aspects of building an attack detection machine learning model and applying the attack detection machine learning model for a sample.

As described above, system 100 can be implemented on one or more computing devices. In particular, components of system 100, as described herein, can be implemented using a processor and an operably coupled memory.

The processor can accept digital data as input, and process the input according to instructions or algorithms, and provides results as outputs.

Memory can comprise volatile or non-volatile memory as required by the coupled processor to not only provide space to execute the instructions or algorithms, but to provide the space to store the instructions themselves. In embodiments, volatile memory can include random access memory (RAM), dynamic random access memory (DRAM), or static random access memory (SRAM), for example. In embodiments, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the invention.

Training module 102 is configured to build one or more machine learning models based on training data. For example, training module 102 can receive as inputs a plurality of original samples 108 and a plurality of attack samples 110 as training data. In an embodiment, plurality of original samples 108 includes original images. In an embodiment, plurality of attack samples 110 includes fake images. In another embodiment, training module 102 can be trained only on a plurality of original samples 108 or a plurality of attack samples, depending on the class definitions.

Figure 2:
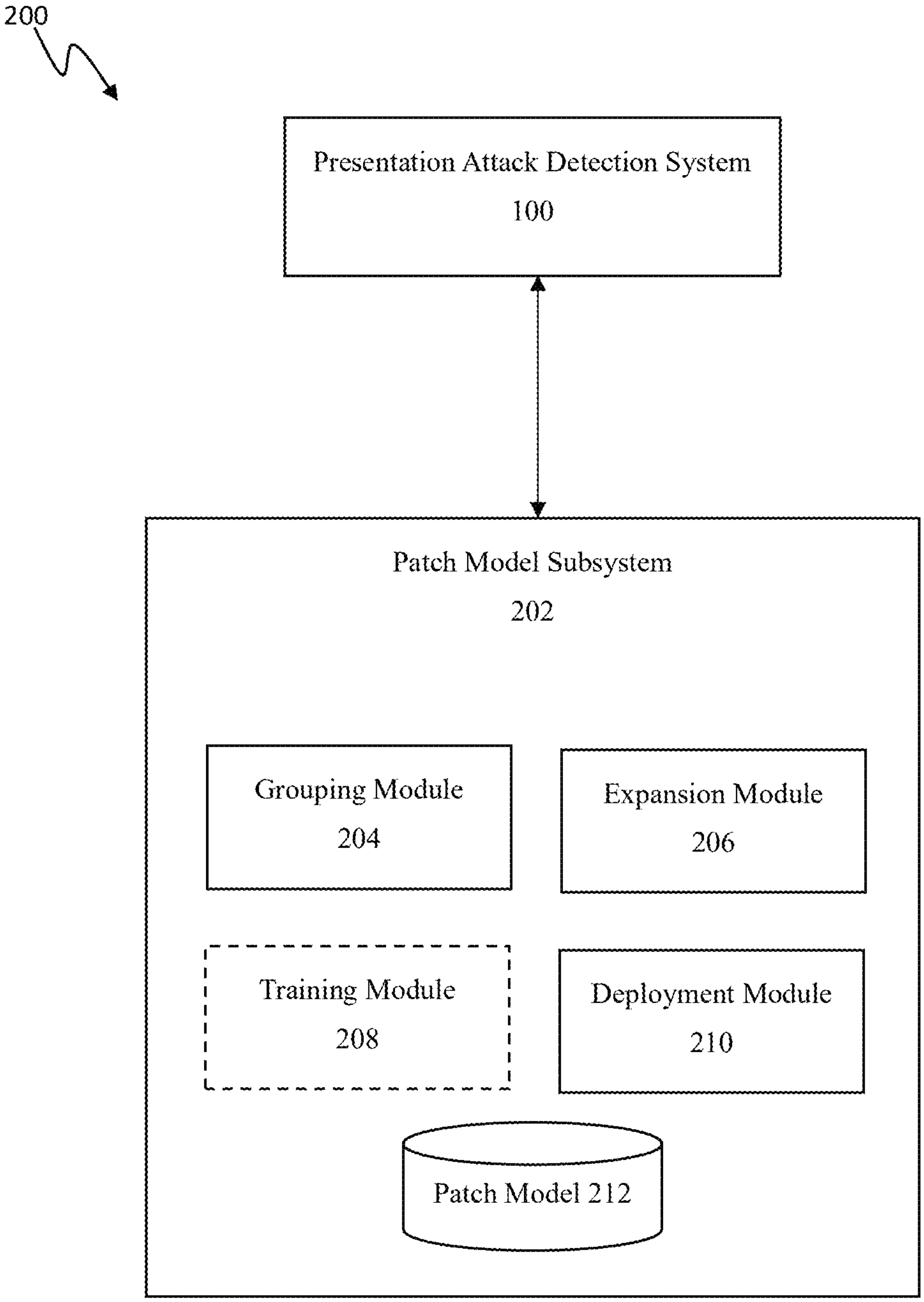
FIG. 2 is a block diagram of a system for modifying a machine learning model in presentation attack detection, according to an embodiment.

Plurality of original samples 108 and plurality of attack samples 110 can be stored in one or more databases. For example, as depicted in FIG. 2, system 100 comprises two databases for training data (e.g. 108 and 110). However, one skilled in the art will readily appreciate that additional or fewer databases can be utilized. In embodiments, the databases can each comprise simple non-volatile memory as part of a computer. In embodiments, the databases can each comprise database management systems such as ORACLE, IBM DB2, or MICROSOFT SQL SERVER, for example. In embodiments, each of the databases comprises a plurality of databases.

As depicted in FIG. 1, training module 102 can build a machine learning model such as attack detection ML model 104 using training data. Machine learning model 104 is a machine learning model trained based on plurality of original samples 108. As described above, machine learning model 104 can be a general model or a production model. In embodiments, as will be described, training module 102 can further build a machine learning model such as a patch model.

Machine learning model 104 can be generated using an artificial neural network (ANN), decision tree, support-vector machine (SVM), regression analysis, Bayesian network, Gaussian process, genetic algorithm (GA), or any other suitable machine learning system model. Although a single model 104 is depicted in FIG. 1, a plurality of models can likewise be utilized.

In an embodiment, model 104 is configured to process sets of samples by extracting sets of characteristic features from the sets of samples in order to separate the elements of the collections representing the set of features of each sample in a feature space. Accordingly, model 104 is trained and subsequently utilized to process additional data by attack detection module 106 to detect an attack.

In an embodiment, training module 102 can utilize plurality of attack samples 110 to test or validate model 104. For example, a known attack sample can be applied to model 104 to test or validate that model 104 properly classifies the known attack sample in the disjoint sets. If model 104 properly classifies the known attack sample as an attack, system 100 can be determined to be validated. If model 104 does not properly classify the known attack sample as an attack training model 104 can retrain model 104.

In particular, attack detection module 106 is configured to use model 104 to analyze a sample 105. Specifically, attack detection module 106 can utilize the sets of characteristic features according to model 104 to classify sample 105. Attack detection module 106 is accordingly further configured to classify sample 105 as an original image 112 (no attack) or an attack 114, according to model 104. In another embodiment, attack detection module 106 is configured to classify sample 105 as an original image 112 (no attack), threat of class A, threat of class B. In embodiments, model 104 can include Type I and/or Type II errors such that attack detection module 106 cannot accurately classify certain test samples 105. Such errors can result in model 104 and system 100 vulnerable to presentation attacks. Accordingly, embodiments described herein can correct model 104 using one or more patch models.

Referring to FIG. 2, a block diagram of a system 200 for modifying a machine learning model in presentation attack detection is depicted, according to an embodiment. In particular, the system can handle misclassified samples. System

200 generally comprises a training module 202, a patching module 204, a baseline machine learning (ML) model 206, a corrector machine learning (ML) model 208, an augmentation unit 210, and a patched baseline machine learning (ML) model 212.

Training module 202 is configured to build corrector ML model 208. In an embodiment, as depicted in FIG. 2, training module 202 can build corrector ML model 208 based on a plurality of original samples 214, a plurality of attack samples 216, and a plurality of misclassified samples 222, as will be described further below.

Patching module 204 is configured to integrate a corrector model into one or more other machine learning models used in production environments. For example, patching module 204 is configured to integrate corrector ML model 208 into patched baseline ML model 212.

Baseline ML model 206 is configured to classify an input sample as an original image or as non-original image. In embodiments, certain samples are misclassified. For example, misclassified samples can include original samples that are classified by baseline model 206 as a non-original or non-original samples that are classified by baseline model 206 as original. System 200 therefore treats misclassified samples as an anomaly, while all other samples are treated as regular. Accordingly, corrector ML model 208 is built by training module 202 to classify whether the sample is regular or an anomaly.

Corrector ML model 208 generally comprises an anomaly detector 218 and a correction shifter 220. In an embodiment, anomaly detector 218 is configured to classify an input sample as regular or anomaly. In an embodiment, correction shifter 220 is configured to shift a prediction value. In particular, correction shifter 220 can utilize a correction shift (e.g. a number that will be either subtracted or added to the prediction of the baseline model if anomaly detector 218 classifies a sample as anomaly).

Training module 202 is configured to build corrector ML model 208 using a training dataset including a large set of samples (both original 214 and non-original 216) that are classified correctly by baseline model 206. The set that is classified correctly is annotated as regular. Training module 202 is further configured to build corrector ML model 208 using augmented misclassified samples, which are annotated as anomaly.

Augmentation unit 210 is configured to receive samples that are misclassified by baseline ML model 222 (e.g. misclassified samples 222) and provide misclassified samples 222 to training module 202. In an embodiment, augmentation unit 210 can expand the group of misclassified samples 222 by augmenting at least one image in the group of misclassified samples 222 to create an expanded dataset. In this manner, training module 202 is provided additional data for training of misclassified samples.

Patching module 204 is further configured to build an updated version of baseline ML model 206 as patched baseline ML model 212. In an embodiment, patched baseline ML model 206 can be executed to produce a baseline score.

If anomaly detector 218 classifies the sample as an anomaly, patched baseline ML model 206 can calculate the final score as the baseline score with addition (if the sample is classified as an original by the base model) or subtraction (if the sample is classified as an non-original by the base model) of the correction shift from of correction shifter 220. If anomaly detector 218 classifies the sample as an anomaly, patched baseline ML model 206 can calculate the final score as the baseline score.

Patched baseline ML model 212 can therefore be utilized to classify a sample as original 224 or an attack 226 based on the aforementioned scoring. In an embodiment, a final score threshold is used to compare against the final score. In an embodiment, the final score threshold is the same for the baseline model and for the patched baseline model. For example, if the classification is based on comparing the norm of a feature vector of the tested sample and the threshold is set to 1, then the baseline model calculates the norm of the sample and compares it to 1.

If the baseline model is trained in a way that original samples' norm is less than the threshold (less than 1), then for non-original (attack) samples the norm will be more than 1. In this example, if one of the tested samples is detected as an anomaly, then the norm (score) will be increased/decreased to the shift value. The shift value can be positive or negative. For example, if the baseline score for the sample is 0.9, and the threshold is 1, the sample (in a baseline is classified as original), anomaly detector determines that this sample is anomaly. Then the patched model will add a shift equal to 0.11 and the final score will be 1.1. Compared to the threshold, the final score is greater than the threshold, so in final the sample (and all other samples in a group of augmented samples) will be classified as non-original (attack).

Figure 3:
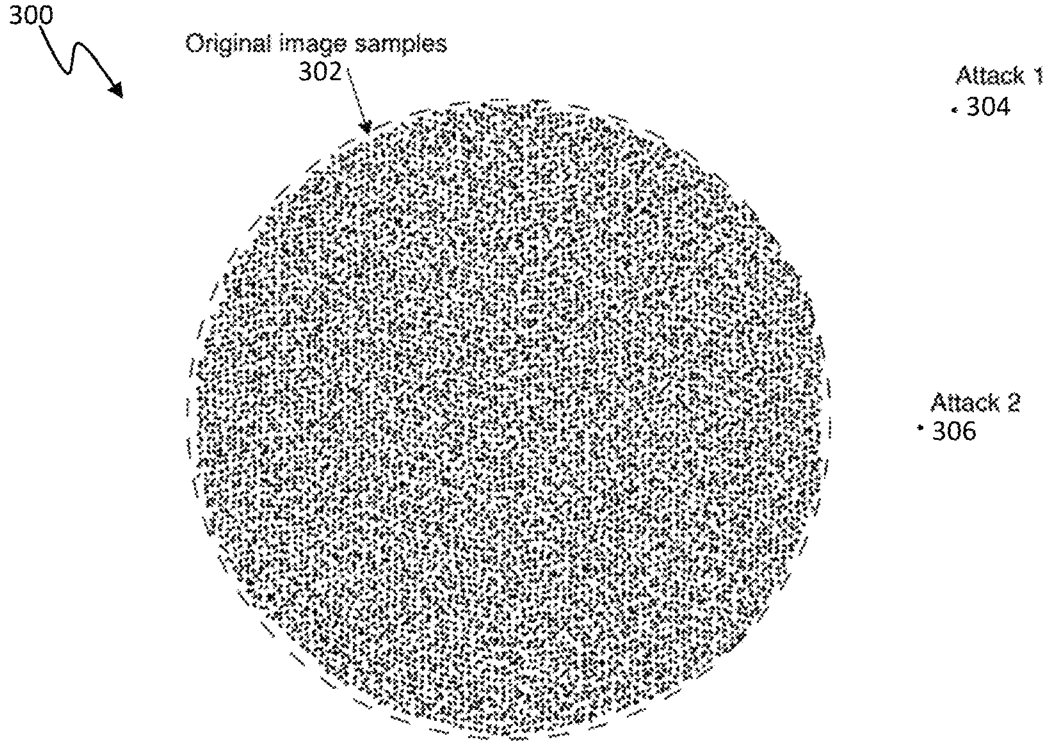
FIG. 3 is a diagram of a feature space created by a machine learning model for original image samples and attack samples, according to an embodiment.

Referring to FIG. 3, a diagram of a feature space 300 created by a machine learning model for original image samples and attack samples is depicted, according to an embodiment.

In particular, FIG. 3 illustrates a feature space of original image samples 302 and two attack samples: Attack 1 sample 304 and Attack 2 sample 306.

Accordingly, feature space 300 depicts a typical distribution of sample representations in which original images and attacks are determined. For example, a model generating feature space 300 can be trained in such a way that original image samples 302 are clustered. Thus, any point in the cluster in feature space 300 of the model will represent the original image, and outside the cluster represents an attack. As illustrated, Attack 1 sample 304 and Attack 2 sample 306 are outside the sphere, representing attacks. This representation reflects the process of determining whether a test sample belongs to the class of original images.

Figure 4A:
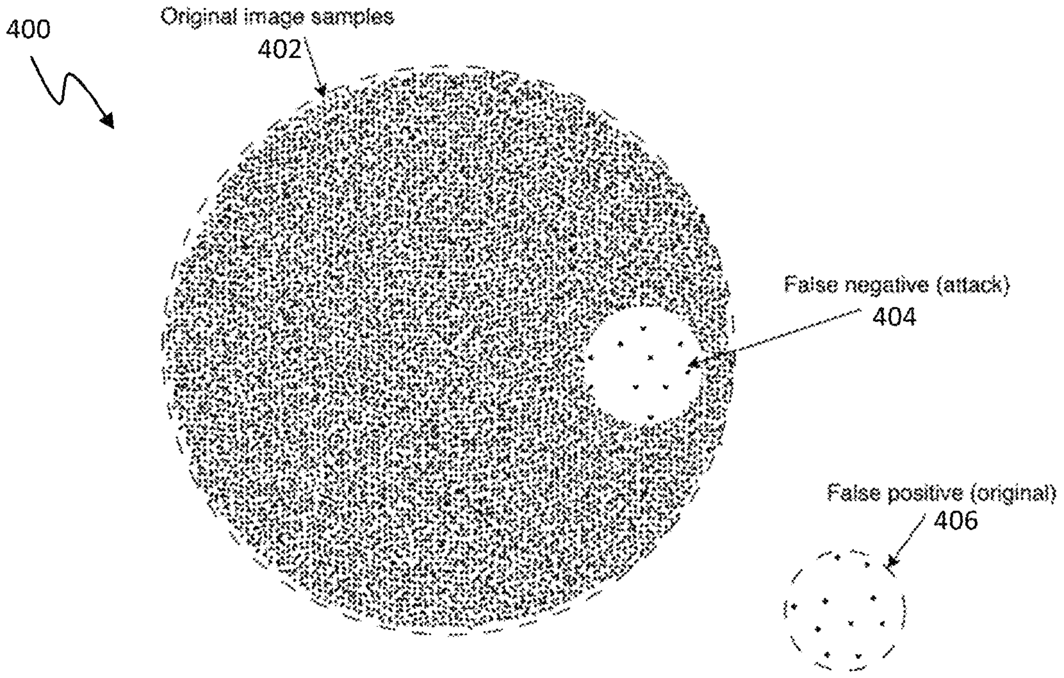
FIGS. 4A-4B are diagrams of a feature space created by a machine learning model including false positive (Type I) errors and false negative (Type II) errors, according to an embodiment.
Figure 4B:
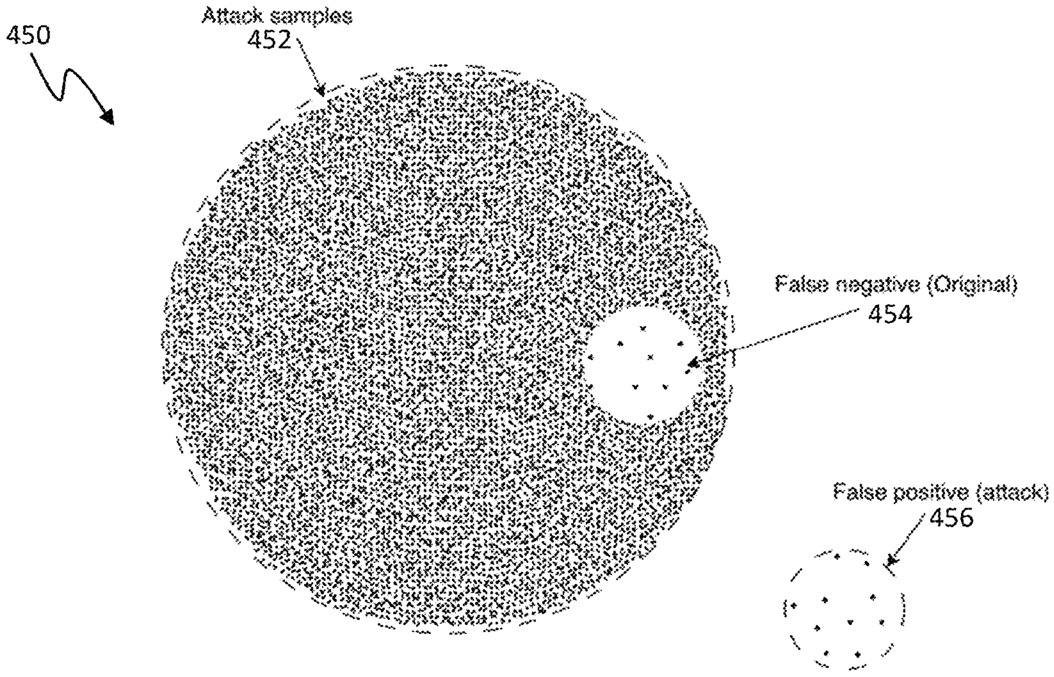

Referring to FIGS. 4A-4B, diagrams of a feature space created by a machine learning model including false positive (Type I) errors and false negative (Type II) errors are depicted, according to an embodiment.

In particular, FIG. 4A includes a feature space 400 illustrating original image samples 402, false negative samples 404, and false positive samples 406. In particular, false negative samples 404 are actual attacks incorrectly classified as original image samples (e.g. in the sphere of original image samples 402). Likewise, false positive samples 406 are original images incorrectly classified as attacks (e.g. incorrectly classified as outside the sphere of original image samples 402). FIG. 4A therefore depicts an original-centric model.

In an embodiment, false negative samples 404 and false positive samples 406 are erroneously classified by system 100. False negative samples 404 and false positive samples 406 can include certain features that are erroneously classified by system 100. Incorrect classification can be due to new or previously unknown types of attacks.

FIG. 4B includes a feature space 450 illustrating attack samples 452, false negative samples 454, and false positive samples 456. In particular, false negative samples 404 are original image samples incorrectly classified as attack samples. Likewise, false positive samples 456 are attack samples incorrectly classified as original image samples (e.g. incorrectly classified as outside the sphere of attack samples 402). FIG. 4B therefore depicts an attack-centric model.

Accordingly, and referring again to FIG. 2, false negative samples 404 and false positive samples 406 (in the example of FIG. 4A), and false negative samples 454 and false positive samples 456 (in the example of FIG. 4B) can be determined by anomaly detector 218.

Figure 5:
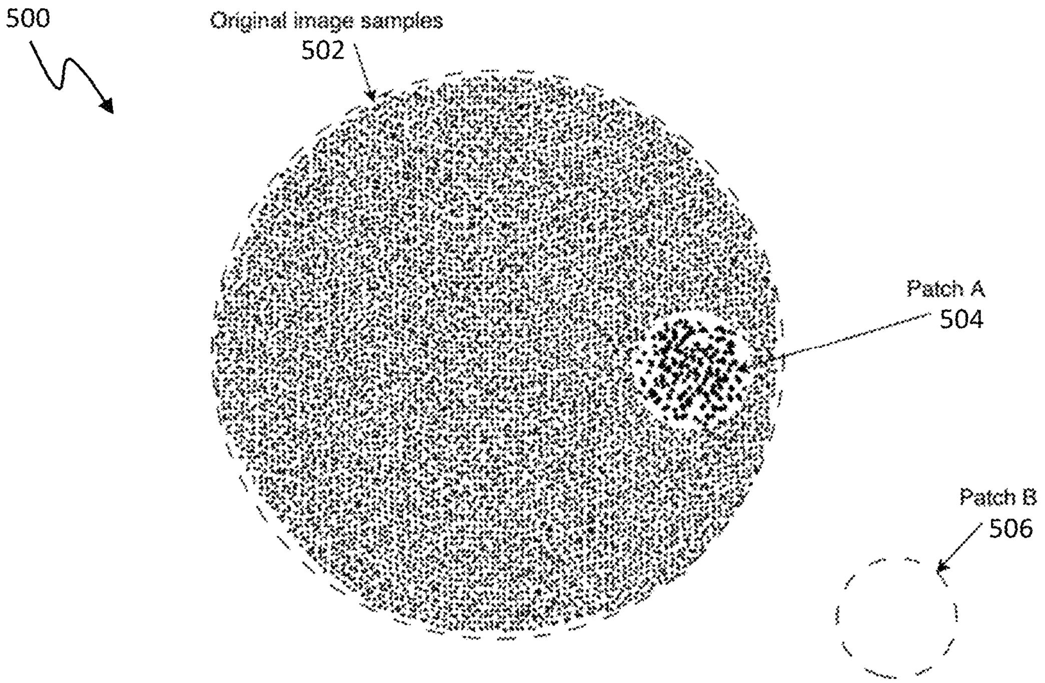
FIG. 5 is a diagram of a feature space created by a machine learning model including patches in the feature space, according to an embodiment.

Referring to FIG. 5, a diagram of a feature space 500 created by a machine learning model including patches in the feature space is depicted, according to an embodiment. In particular, feature space 500 includes original image samples 502, a Patch A 504, and a Patch B 506.

Referring again to FIG. 4A, Patch A 504 patches original image samples 502 to correct the false negative samples 404 that were incorrectly classified as original image samples. In an embodiment, for false negative samples 404, consider a universe of 10 samples. Using these 10 samples, grouping module 204 in coordination with expansion module 206 can generate an expanded dataset of 1000 samples. Training module 202 can then train patch model 212 on the expanded dataset of 1000 samples. In other embodiments, other numbers of initial universe values can be utilized to create expanded datasets. For example, 5, 15, 20, 25, or 30 samples can be used to generate expanded datasets of 500, 750, 1250, 1500, 2000, or 10,000 or more samples.

In an embodiment, a patch model that is placed after the general model can complement or invert the results for samples that fall under the patch applicability criteria, depending on the type of error. Accordingly, feature space 500 represents a patched model. The patched model includes previously-vulnerable feature space 502 corrected with Patch A 504 and Patch B 506.

As depicted, the images of FIGS. 4A-5 are merely illustrative of space generated by the model(s). Other relative spaces having dimensions corresponding to the dimension of the feature vector generated by the model can likewise be utilized, as those depicted herein are merely presented for ease of explanation.

Figure 6:
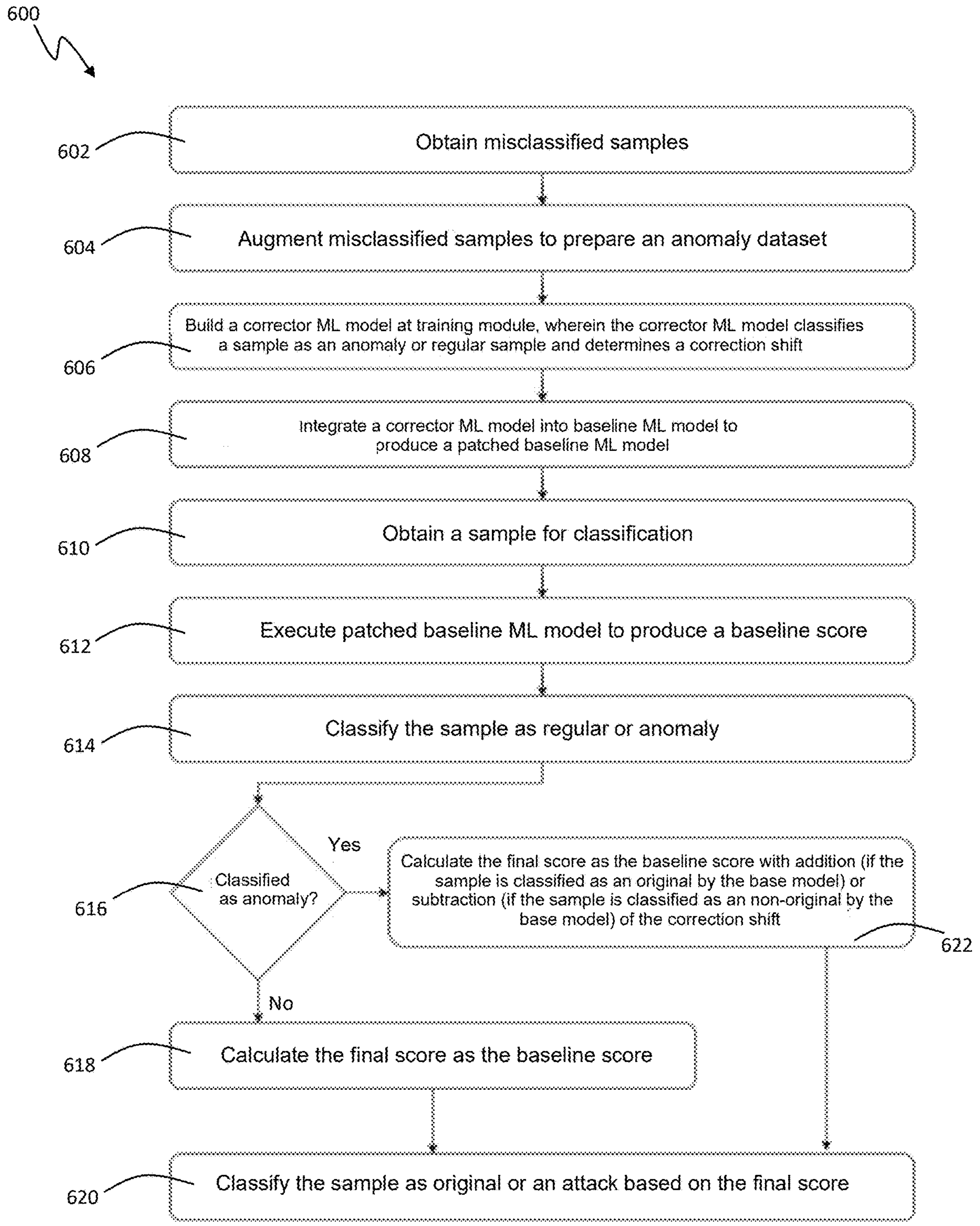
FIG. 6 is a flowchart of a method for modifying a machine learning model in presentation attack detection, according to an embodiment.

Referring to FIG. 6, a flowchart of a method 600 for modifying a machine learning model in presentation attack detection is depicted, according to an embodiment. In an embodiment, method 600 can be implemented by systems and subsystems described herein. Further reference is made to system 200 as illustrated in FIG. 2.

At 602, one or more misclassified samples are obtained. For example, misclassified samples can include original samples that are classified by baseline model 206 as a non-original or non-original samples that are classified by baseline model 206 as original. Augmentation unit 210 can obtain the one or more misclassified samples.

At 604, the one or more misclassified samples are augmented. For example, augmentation unit 210 can expand the group of misclassified samples 222 by augmenting at least one image in the group of misclassified samples 222 to create an expanded dataset as an anomaly dataset.

At 606, a corrector machine learning (ML) model is built. In an embodiment, the corrector ML model is configured to classify an image sample as an anomalous or regular and determine a correction shift. For example, corrector ML model can be corrector ML model 208 including anomaly detector 218 and correction shifter 220.

At 608, the corrector ML model built at 806 is integrated into a baseline ML model to generate a patched baseline ML model. For example, baseline ML model 206 that misclassified samples obtained at 802 can be patched as patched baseline ML model 212.

At 610, an image sample for classification (e.g. determination of a presentation attack) can be obtained. For example, a presentation attack detection system can obtain the image sample (not depicted in FIG. 2, but which can utilize patched baseline ML model 212.

At 612 the patched baseline ML model can be executed to classify the image sample. For example, patched baseline ML model 212 can be executed.

At 614, the patched baseline ML model is executed to produce a baseline score. For example, patched baseline ML model 212 can be executed to generate a baseline score of the image sample.

At 616, method 800 varies operation based on whether the image sample is classified as regular or anomalous using the patched baseline ML model.

At 618, when the image sample is classified as regular, a final score is calculated as the baseline score. At 622, when the image sample is classified as anomalous, the final score is calculated by correction shifting by addition if the baseline ML classified the image sample as an original image or subtraction if the baseline ML classified the image sample as a non-original image.

At 620, the image sample is determined to be an original image or an attack based on the final score. For example, a presentation attack detection system utilizing patched baseline ML model 212 can make an attack determination by comparison of the final score against a threshold.

Referring to FIG. 7, a flowchart of a method 700 for presentation attack detection is depicted, according to an embodiment.

Method 700 generally comprises at 702, building a corrector machine learning (ML) model and at 704, wrapping a baseline ML model with the corrector ML model to generate a wrapped baseline ML model. Accordingly, in an embodiment of a system for presentation attack detection implementing method 700, the system comprises a baseline machine learning model, a corrector ML model, and a wrapped baseline ML model generated by wrapping the baseline ML model with the corrector ML model. In an embodiment, any of the aforementioned models can comprise at least one of an artificial neural network (ANN), a decision tree, a support-vector machine (SVM), a regression analysis, a Bayesian network, a Gaussian process, or a genetic algorithm (GA).

In an embodiment, building a corrector machine learning at 702 can comprise a plurality of sub-operations. At 706, a baseline ML model is executed on a plurality of image samples to obtain a plurality of features. In an embodiment, obtaining a plurality of features of the plurality of image samples includes extracting features in sets. In an embodiment, the corrector ML model utilizes features extracted from image sequences by the baseline ML model.

At 708, a calibration dataset of a plurality of image samples that are processed correctly by the baseline ML model is selected as a calibration dataset. In an embodiment, the calibration dataset can be utilized to test the corrector ML model. In an embodiment samples that are processed correctly means that the verdict of the model is correct, i.e. matches the real class of the sample (original or attack). In an example, dozens of thousands of samples in the calibration dataset are utilized. To test the corrected (patched) model, the model is applied both to the calibration dataset and to erroneous samples. Erroneous samples are thus expected to be classified correctly by the patched model and the metrics of the patched model (FAR, FRR, FRR at FAR, etc.) on the calibration dataset are also expected not to degrade significantly compared to the corresponding metrics for the baseline model.

At 710, at least one misclassified image sample is determined. In an embodiment, a misclassified image sample has a verdict from the baseline ML model that needs to be corrected. For example, if the sample is classified as anomalous when the class is a real sample, then the verdict of the base model should be corrected. If the sample is classified as real when the class is an anomalous sample, then the verdict of the base model should be corrected.

At 712, at least one augmentation is applied to the at least one misclassified image sample to obtain an augmented image. In an embodiment, if the augmented image is still misclassified by the baseline model, the augmented image is added to an anomaly dataset.

At 714, the augmentation is applied to at least one other misclassified image sample until the size of the anomaly dataset reaches a threshold value. For example, the threshold value for the anomaly dataset can be predefined. In another embodiment, the threshold value for the anomaly dataset can be dynamically created. For example, a threshold value can be hundreds, thousands, a few thousand, or several thousand.

At 716, a plurality of features of the baseline ML model are determined. For example, the plurality of features of the baseline ML model can be associated with the calibration dataset and the anomaly dataset.

At 720, a linear discriminant analysis is applied to build a linear classifier. In one example, a Fisher Linear Discriminant Analysis is used. In embodiments, other types of classifiers can be utilized, including generative and discriminative models such as a linear discriminant analysis (LDA), a Naive Bayes classifier, a logistic regression, a perceptron analysis, or a support vector machine (SVM).

At 722, a correction shift is determined. In an embodiment, a correction shift can be a value that ensures a particular misclassification rate on the anomaly dataset with a particular minimum misclassification rate on the calibration dataset. In an embodiment, misclassification rates (FAR or FRR) on the anomaly dataset should be acceptable according to the business situation under consideration. Typically, a misclassification rate on the anomaly dataset can be expected to be zero and the misclassification rate on the calibration dataset to be very close to the one for the baseline model and the test dataset (or at least not be significantly greater). For example, if the misclassification rate of the baseline model in the production environment is expected to be about 2%, then the misclassification rate of the corrected model on the calibration dataset should not significantly exceed 2%. The value 2.1% may be acceptable (or may not). The value 3% would be unacceptable.

Accordingly, the resulting wrapped baseline ML model can determine image samples as an original image or an attack more effectively than a baseline ML model alone. In an embodiment, at 704, wrapping the baseline ML model with the corrector ML model is a post-processing operation to refine classification results of the baseline ML model.

Figure 8:
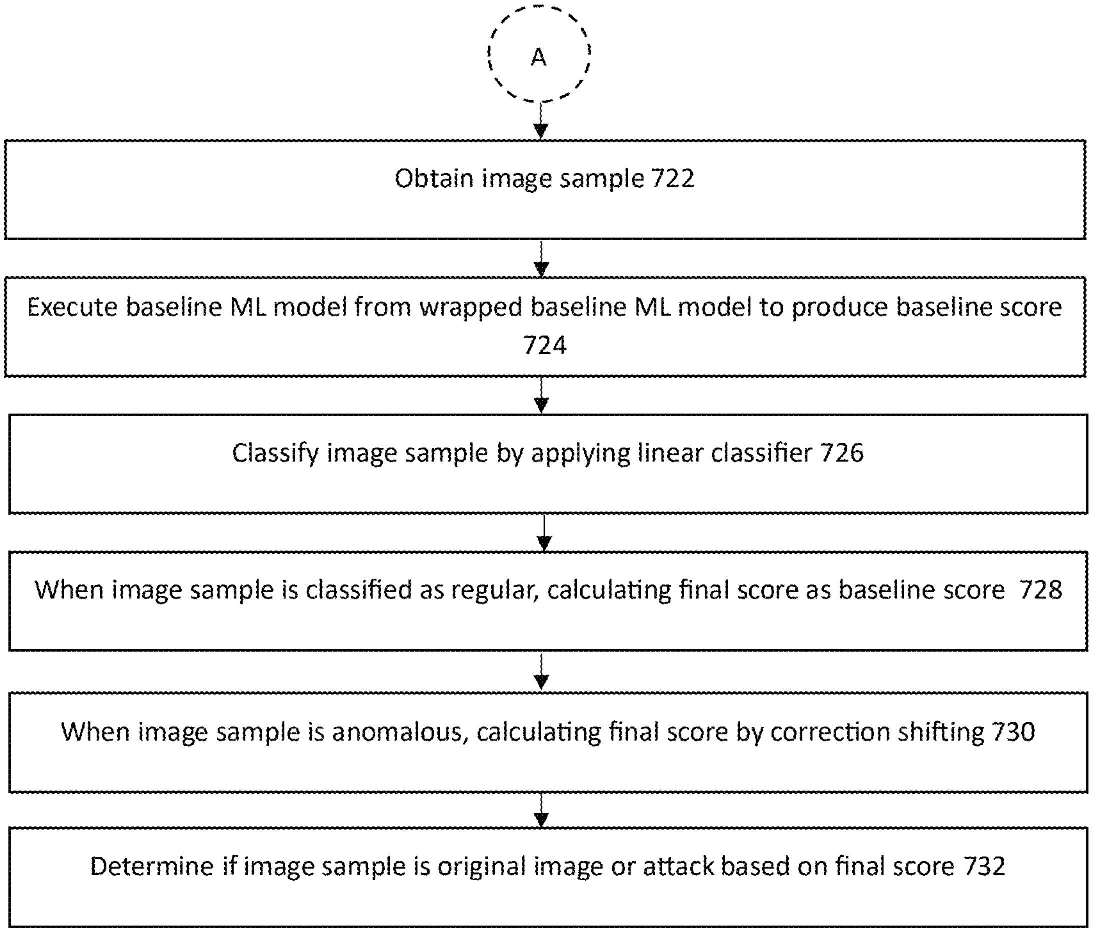

In an embodiment, referring also to FIG. 8, the resulting wrapped baseline ML model can be utilized for attack detection. In an embodiment, a system implementing method operations 722-732 can be an attack detection module.

At 722, an image sample is obtained. For example, the attack detection module can obtain an image sample to test as an original image or an attack, such as by presentation by a user. In another example, an image is communicated to the attack detection module, such as by network communication.

At 724, the baseline ML model from the wrapped baseline ML model is executed to produce a baseline score.

At 726, the image sample is classified by the baseline ML model from the wrapped baseline ML model as regular or anomalous by applying the linear classifier to the features of the baseline ML model. In an embodiment, the linear classifier is applied to the features of the baseline ML model in the wrapped baseline ML model.

At 728, when the image sample is classified as regular, a final score is determined to be the baseline score.

At 730, when the image sample is classified as anomalous, the final score is calculated by correction shifting according to the correction shift. In an embodiment, correction shift is by addition if the baseline ML of the wrapped baseline ML model classified the image sample as an original image or subtraction according to the correction shift if the baseline ML model of the wrapped baseline ML model classified the image sample as a non-original image.

At 732, the image sample is an original image or an attack based on the final score.

The invention claimed is:

1. A method for presentation attack detection, the method comprising:

- building a corrector machine learning (ML) model including by:
  - executing a baseline ML model on a plurality of image samples to obtain a plurality of features,
  - selecting a calibration dataset of a plurality of image samples that are processed correctly by the baseline ML model,
  - determining at least one misclassified image sample, the at least one misclassified image sample having a verdict from the baseline ML model to be corrected,
  - applying at least one augmentation to the at least one misclassified image sample to obtain an augmented image and if the augmented image is still misclassified by the baseline model, adding the augmented image to an anomaly dataset,
  - repeating the applying the at least one augmentation to another at least one misclassified image sample until a size of the anomaly dataset reaches a predefined value,
  - calculating a plurality of features of the baseline ML model associated with the calibration dataset and the anomaly dataset,
  - applying a linear discriminant analysis to build a linear classifier, and
  - determining a correction shift as a value that ensures a particular misclassification rate on the anomaly dataset with a particular minimum misclassification rate on the calibration dataset;
- wrapping the baseline ML model with the corrector ML model to generate a wrapped baseline ML model,
- obtaining an image sample;
- executing the baseline ML model from the wrapped baseline ML model to produce a baseline score;
- classifying the image sample as regular or anomalous by applying the linear classifier to the features of the baseline ML model;
- when the image sample is classified as regular, calculating a final score as the baseline score;
- when the image sample is classified as anomalous, calculating the final score by correction shifting according to the correction shift by addition if the baseline ML of the wrapped baseline ML model classified the image sample as an original image or subtraction according to the correction shift if the baseline ML model of the wrapped baseline ML model classified the image sample as a non-original image; and determining if the image sample is an original image or an attack based on the final score.

2. The method of claim 1, wherein obtaining the plurality of features of the plurality of image samples includes extracting features in sets.

3. The method of claim 1, wherein the calibration dataset is utilized to test the corrector ML model.

4. The method of claim 1, wherein the baseline ML model includes at least one of an artificial neural network (ANN), a decision tree, a support-vector machine (SVM), a regression analysis, a Bayesian network, a Gaussian process, or genetic algorithm (GA).

5. The method of claim 1, wherein the corrector ML model includes at least one of an artificial neural network (ANN), a decision tree, a support-vector machine (SVM), a regression analysis, a Bayesian network, a Gaussian process, or genetic algorithm (GA).

6. The method of claim 1, wherein the corrector ML model utilizes features extracted from image sequences by the baseline ML model.

7. The method of claim 1, wherein wrapping the baseline ML model with the corrector ML model is a post-processing operation to refine classification results of the baseline ML model.

8. The method of claim 1, wherein the linear classifier is applied to the features of the baseline ML model in the wrapped baseline ML model.

9. A system for presentation attack detection, the system comprising:

a baseline machine learning (ML) model;

a corrector ML model, built including by:

executing the baseline ML model on a plurality of image samples to obtain a plurality of features, selecting a calibration dataset of a plurality of image samples that are processed correctly by the baseline ML model, determining at least one misclassified image sample, the at least one misclassified image sample having a verdict from the baseline ML model to be corrected, applying at least one augmentation to the at least one misclassified image sample to obtain an augmented image and if the augmented image is still misclassified by the baseline model, adding the augmented image to an anomaly dataset, repeating the applying the at least one augmentation to another at least one misclassified image sample until a size of the anomaly dataset reaches a predefined value, calculating a plurality of features of the baseline ML model associated with the calibration dataset and the anomaly dataset, applying a linear discriminant analysis to build a linear classifier, and determining a correction shift as a value that ensures a particular misclassification rate on the anomaly dataset with a particular minimum misclassification rate on the calibration dataset;

a wrapped baseline ML model generated by wrapping the baseline ML model with the corrector ML model, at least one processor and memory operably coupled to the at least one processor; and instructions that, when executed by the at least one processor, cause the at least one processor to implement:

an attack detection module configured to:

obtain an image sample;

execute the patched baseline ML model from the wrapped baseline ML model to produce a baseline score, classify the image sample as regular or anomalous by applying the linear classifier to the features of the baseline ML model, when the image sample is classified as regular, calculating a final score as the baseline score, when the image sample is classified as anomalous, calculating the final score by correction shifting according to the correction shift by addition if the baseline ML of the wrapped baseline ML model classified the image sample as an original image or subtraction according to the correction shift if the baseline ML model of the wrapped baseline ML model classified the image sample as a non-original image, and determine if the image sample is an original image or an attack based on the final score.

10. The system of claim 9, wherein the corrector ML model is further configured to obtain the plurality of features of image sample in sets.

11. The system of claim 9, wherein the corrector ML model is further built testing the corrector ML model with the calibration dataset.

12. The system of claim 9, wherein the baseline ML model includes at least one of an artificial neural network (ANN), a decision tree, a support-vector machine (SVM), a regression analysis, a Bayesian network, a Gaussian process, or genetic algorithm (GA).

13. The system of claim 9, wherein the corrector ML model includes at least one of an artificial neural network (ANN), a decision tree, a support-vector machine (SVM), a regression analysis, a Bayesian network, a Gaussian process, or genetic algorithm (GA).

14. The system of claim 9, wherein the corrector ML model utilizes features extracted from image sequences by the baseline ML model.

15. The system of claim 9, wherein wrapping the baseline ML model with the corrector ML model is a post-processing operation to refine classification results of the baseline ML model.

16. The system of claim 9, wherein the linear classifier is applied to the features of the baseline ML model in the wrapped baseline ML model.

17. A method for presentation attack detection, the method comprising:

wrapping a baseline machine learning (ML) model with a corrector ML model to generate a wrapped baseline ML model;

obtaining an image sample;

executing the baseline ML model from the wrapped baseline ML model to produce a baseline score;

classifying the image sample as regular or anomalous by applying a linear classifier to the features of the baseline ML model;

when the image sample is classified as regular, calculating a final score as the baseline score;

when the image sample is classified as anomalous, calculating the final score by correction shifting according to a correction shift by addition if the baseline ML of the wrapped baseline ML model classified the image sample as an original image or subtraction according to the correction shift if the baseline ML model of the wrapped baseline ML model classified the image sample as a non-original image; and determining if the image sample is an original image or an attack based on the final score.

18. The method of claim 17, further comprising setting the correction shift as a value that ensures a particular misclassification rate on the anomaly dataset with a particular minimum misclassification rate on a calibration dataset.

* * * * *